F. B. SMITH.
FOOT-MEASURE.

No. 177,762.  Patented May 23, 1876.

WITNESSES:
C. Neveux
John Goethals

INVENTOR:
F. B. Smith
BY
ATTORNEYS.

UNITED STATES PATENT OFFICE.

FRANCIS B. SMITH, OF NEW YORK, N. Y.

IMPROVEMENT IN FOOT-MEASURES.

Specification forming part of Letters Patent No. 177,762, dated May 23, 1876; application filed April 10, 1876.

*To all whom it may concern:*

Be it known that I, FRANCIS B. SMITH, of the city, county, and State of New York, have invented a new and Improved Foot-Measure, of which the following is a specification:

My invention consists of a vertically-adjustable heel-rest, in combination with a foot-plate, in which is a sliding measure and tape-measures to take the measures of the foot, the said elevating heel-rest being to adjust the foot more nearly in the position it occupies in the shoe, so as to make the measures more exact.

My invention also consists of the tapes for taking the transverse measures, connected to turning studs, one in the heel, and the other in the sliding portion of the ball, to enable them to be shifted readily to measure over any part of the foot, to take the size and shape, and locate any enlargements exactly to enable the shoe to be fitted to them. The studs to which the tapes are connected have a detachable pin, to be employed for fastening a sheet of paper under the sole of the foot, to be used as a record of the measures, and a kind of chart, by which to gage the measures to the last to be made to the measures taken from the foot by this instrument.

Figure 1:
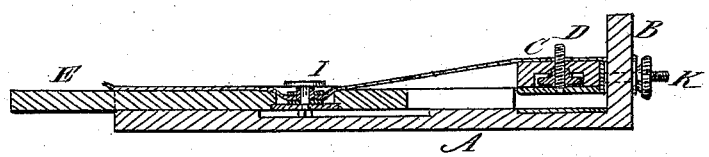
Figure 2:
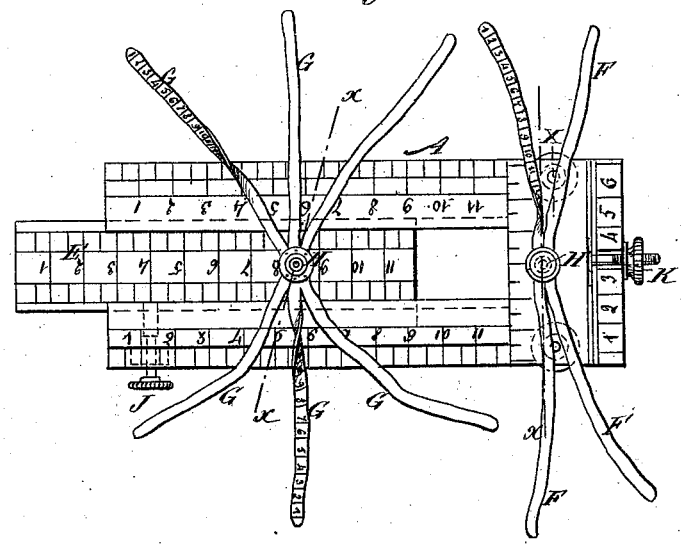
Figure 3:
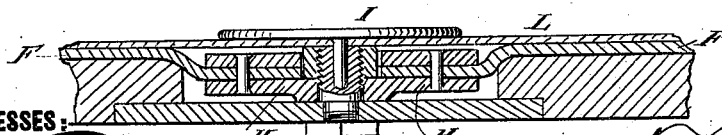

Figure 1 is a longitudinal sectional elevation of my improved measures. Fig. 2 is a plan view, and Fig. 3 is a section on line X X.

A is the base-plate, at one end of which is a vertical flange or plate, B, to gage the heel of the foot at that end. In front of this gage-plate B is a vertically-adjustable heel-plate, C, for raising the heel relatively to the ball, about the same as it stands in the shoe, said plate being raised by the adjusting-screws D. E is the sliding scale in the middle of the ball portion of the base-plate, for measuring the length of the foot. F represents the heel-tapes, and G the ball-tapes, for lateral and transverse measures. These tapes are connected to a revolving button, H, so that they can be shifted along the foot forward and backward, to measure it at any point. The button for the ball-tapes is attached to the slide E, so that it can be adjusted toward and from the center of the heel-tapes, suitably for adjusting the ball-tapes to the center of the ball of a foot of any size. I represents the pins for fastening on a sheet of paper, L, on which to record the measures, and for use as a chart or pattern in transferring the measures from the instrument to the last to be fitted, which is done by tacking the paper through the holes made by the pins I to the bottom of the last, the joints where the tacks enter corresponding to those from which the measures of the foot are taken, and the paper being marked with the measures taken of the foot, so that it serves as a gage to which the last is to be dressed, the last being first shaped as required on the bottom. J and K represent binding-screws, by which to secure the slide E and the heel-plate C in position after they are adjusted. The scale on the slide E shows the length or size of the foot, and the marginal scales of the base-piece indicate the points at which the foot is measured by the tapes.

Having thus described my invention, what I claim as new, and desire to secure by Letters Patent, is—

1. The vertically-adjustable heel-piece C, in combination with the foot-measure, substantially as described.

2. The stud-pins I, combined with the tape-centers, substantially as described.

FRANCIS B. SMITH.

Witnesses:
T. B. MOSHER,
ALEX. F. ROBERTS.